United States Patent
Yamada

(10) Patent No.: US 9,296,314 B2
(45) Date of Patent: Mar. 29, 2016

(54) SPIRAL SPRING

(75) Inventor: Nobuo Yamada, Kariya (JP)

(73) Assignee: NIHON TECHNICA CO., LTD., Kariya-shi (JP)

( * ) Notice: Subject to any disclaimer, the term of this patent is extended or adjusted under 35 U.S.C. 154(b) by 203 days.

(21) Appl. No.: 13/120,138

(22) Filed: Mar. 21, 2011

(65) Prior Publication Data

US 2011/0198789 A1    Aug. 18, 2011

Related U.S. Application Data

(63) Continuation of application No. PCT/JP2008/067601, filed on Sep. 22, 2008.

(51) Int. Cl.
*F16F 1/10* (2006.01)
*B60N 2/235* (2006.01)

(52) U.S. Cl.
CPC ............... *B60N 2/2356* (2013.01); *F16F 1/10* (2013.01)

(58) Field of Classification Search
CPC ............. F16F 1/10; F16F 1/025; F16F 1/047; F16F 1/326
USPC ................. 267/167, 154, 155, 156, 272, 273
See application file for complete search history.

(56) References Cited

FOREIGN PATENT DOCUMENTS

| JP | 49-83455 U | 7/1974 |
|---|---|---|
| JP | 55-022475 A | 2/1980 |
| JP | 3-060490 U | 6/1991 |
| JP | 2003-148533 A | 5/2003 |
| JP | 2006-177385 A | 7/2006 |
| WO | 2007-086477 A1 | 8/2007 |

OTHER PUBLICATIONS

International Search Report of PCT/JP2008/067601, date of mailing Oct. 21, 2008.

*Primary Examiner* — Robert A Siconolfi
*Assistant Examiner* — Vu Q Nguyen
(74) *Attorney, Agent, or Firm* — Westerman, Hattori, Daniels & Adrian, LLP

(57) ABSTRACT

A spiral spring for a reclining adjustment mechanism for a vehicle seat in which ridges are formed on both ends in a direction perpendicular to a coiling direction of a surface of a spring plate member formed by a band-like steel plate having high hardness so that the ridges project from the surface, projected surfaces of the ridges are curved, and the spring plate member is spirally formed into a coil. The spring plate member has a pitch coiled structure in which a gap between an intermediate spring plate member and an inner spring plate member is formed to be smaller than a gap between an outer spring plate member and the intermediate spring plate member. An engagement piece bent in the radial direction is formed at the end of the outer spring plate member, and an engagement coiled core section is formed in the inner spring plate member.

6 Claims, 13 Drawing Sheets

SPIRAL SPRING

CROSS REFERENCE TO RELATED APPLICATIONS

This application is a continuation of International Application No. PCT/JP2008/67601, filed on Sep. 22, 2008, and designating the United States of America, the entire contents of which is incorporated herein by reference.

BACKGROUND OF THE INVENTION

1. Technical Field

The present invention relates to a spiral spring employed in a reclining adjustment mechanism provided in a seat frame of a vehicle, specifically relates to a spiral spring formed by spirally forming (coiling into a pitch coiled structure) a band-like steel plate (spring plate member) having high hardness.

2. Background Art

Conventionally, this type (reclining adjustment mechanism) of spiral spring is wound (tightened) when a seat back is tilted backward, and rewound (loosened) to return to an initial shape when the seat back is tilted forward.

However, in a conventional spiral spring, while being wound, there is contact and/or friction and catching between a front surface and a back surface (plate surfaces) facing each other of a spring plate member, and the winding is restricted or stopped at a position where the friction or the catching occurs, or the spiral spring is continuously wound in a distorted condition. In such a condition, spring performance such as correct winding or rewinding cannot be sufficiently exerted, and problems occur such as, the seat back does not tilt, or the seat back does not return to the original position.

To improve such a situation, there are prior documents as follows:

[1] "Spiral spring" of Japanese Unexamined Utility Model Registration Application Publication No. 59-191437. This utility model is characterized in that a concave portion is formed in a coiling direction of a plate member (spring plate member), and the concave portion is sequentially decreased from an inner portion to an outer portion (from the inner end portion to the outer end portion) to reduce the second moment. However, this utility model has problems such as, time and skill is required to manufacture the spiral spring, a dedicated machine is required, and the like.

[2] "Spiral spring" of Japanese Unexamined Utility Model Registration Application Publication No. 49-83455. This utility model is characterized in that, in a coiling direction of a plate material (spring plate member), ridges are formed on a front surface and/or a back surface (a single surface or both surfaces), and an area between the ridges is used to retain lubricant, so that, by the lubricant, abnormal noise is prevented from occurring and durability is improved. However, this utility model has a structure in which many grooves are formed, so that it cannot be considered to form the spiral spring by cold rolling (material is difficult to move). In addition, this utility model does not disclose a pitch coiled structure which is best suited to a reclining adjustment mechanism and in which a gap between an outer spring plate member and an intermediate spring plate member and a gap between the intermediate spring plate member and an inner spring plate member are adjusted. This is a usual spiral spring and it is considered that this spiral spring has a problem when being used as a spiral spring for a vehicle described below.

[3] "Spiral spring" of Japanese Unexamined Patent Application Publication No. 55-44174. This invention is characterized in that a cross-section of the spring plate has a circular arc shape, so that material is saved and the spring is lightened. However, this invention does not disclose a pitch coiled structure, so that it is considered that this invention has the same problem as in document [2].

[4] "Spiral spring" of Japanese Unexamined Patent Application Publication No. 9-257070. This invention is characterized in that the inner portion (coiled center) and the outer portion (circumferential portion) of the spiral spring are divided by a line, a gap between the spring plates of the outer portion or the inner portion whose diameter is large is set to be larger than a gap between the spring plates of the outer portion or the inner portion whose diameter is small when the spring is in a free state, and the spring plates are not in contact with each other (friction is set to be substantially 0) when the spring is tightened, so that spring performance is exerted and fatigue is reduced. However, it is considered that the simple structure of this invention in which the inner portion and the outer portion are divided by a line cannot sufficiently cope with a reclining adjustment mechanism in which complex movement of a vehicle and/or an applied load vary.

[5] "Spiral spring" of Japanese Unexamined Patent Application Publication No. 2003-148533. This invention has a structure in which, in a spiral spring formed by spirally forming a band-like steel plate having high hardness, shapes of surfaces of steel plates facing each other are differentiated from each other (a structure in which projection is provided on plate surfaces facing each other). This invention is characterized in that spring performance is achieved while reducing a contact area between the plate surfaces facing each other and avoiding catching when the spiral spring is being wound. However, this invention does not sufficiently disclose a pitch coiled structure, so that it is considered that this invention has the same problem as in document [2].

[6] "Spiral spring structure" of Japanese Unexamined Patent Application Publication No. 2006-177385. This invention is a spring which can be formed by a surface compaction roller, and this invention is characterized in that a pair of ridges are continuously formed on both ends in a direction perpendicular to a coiling direction of the spring, and the spring is used as a source of power or used for a reclining adjustment mechanism. However, this invention does not sufficiently disclose a pitch coiled structure, so that it is considered that this invention has the same problem as in document [2].

The utility models and the inventions in the above-described documents [1] to [6] do not sufficiently disclose a pitch coiled structure best suited to a reclining adjustment mechanism, so that further improvements and innovations are required. In particular, the utility models and the inventions in the above-described documents [1] to [6] do not have a means for solving a problem related to the returning speed of the spring and/or the reclining seat, so that it is considered that the utility models and the inventions are not suited to this type of reclining adjustment mechanism.

DISCLOSURE OF INVENTION

In view of the above situation, to achieve the pitch coiled structure (spring characteristics of a reclining adjustment mechanism), the present invention provides two types of spiral springs, which are a spiral spring having a structure of "a spring plate member formed by a band-like steel plate having high hardness in which an engagement piece bent in the radial direction is formed at the end of the outer spring plate member, an engagement coiled core section is formed in the inner spring plate member, and a gap between the intermediate spring plate member and the inner spring plate member is formed to be smaller than a gap between the outer spring plate member and the intermediate spring plate member" and a spiral spring having a structure of "a spring plate member formed by a band-like steel plate having high hardness in which an engagement piece bent in the radial direction is formed at the end of the outer spring plate member, the engagement core section bent in substantially the same radial direction as that of the engagement piece is formed on the inner spring plate member, and a gap between the intermediate spring plate member and the inner spring plate member is formed to be larger than a gap between the outer spring plate member and the intermediate spring plate member". The present invention intends to surely achieve reliable winding of the spiral spring (seat back is smoothly tilted to a rear position) and restoration of the spiral spring to the original state (the seat back is smoothly returned to a forward position) which are characteristics of spiral springs, avoid abrasion, catching, and frictional noise at the time of contact, and reduce metal fatigue. As another structure of the present invention, the present invention intends to stabilize the winding load, the returning load, and the returning speed by employing a structure in which an inner spiral portion has an uneven pitch and an outer spiral portion has an even pitch. Further, the present invention intends to solve the problem related to the returning speed of the spring and/or the reclining seat by reducing the contact area and requiring the pitch coiled structure.

Advantages

Claim 1 is a spiral spring which is used for a vehicle in which ridges are formed on both ends of the spiral spring in a direction perpendicular to a coiling direction of a surface of a spring plate member so that the ridges project from the surface, projected surfaces of the ridges are curved, and the spring plate member is spirally formed (coiled), wherein the spiral spring is formed to have a pitch coiled structure in which an outer spring plate member that is an outer end portion of the spiral, an intermediate spring plate member extending from the outer spring plate member, and an inner spring plate member extending from the intermediate spring plate member are coiled, and an engagement piece bent in the radial direction is formed at the end of the outer spring plate member, an engagement coiled core section is formed in the inner spring plate member, and a gap between the intermediate spring plate member and the inner spring plate member is formed to be smaller than a gap between the outer spring plate member and the intermediate spring plate member to form the pitch coiled structure.

Therefore, claim 1 provides a spiral spring which is a spring plate member formed by a band-like steel plate having high hardness, and in which an engagement piece bent in the radial direction is formed at the end of the outer spring plate member, an engagement coiled core section is formed in the inner spring plate member, a gap between the intermediate spring plate member and the inner spring plate member is formed to be smaller than a gap between the outer spring plate member and the intermediate spring plate member, and a pitch coiled structure best suited to a reclining adjustment mechanism is formed. The invention of claim 1 intends to surely achieve reliable winding of the spiral spring and restoration of the spiral spring to the original state which are characteristics of spiral springs, avoid abrasion, catching, and frictional noise at the time of contact, and reduce metal fatigue.

Claim 2 is the spiral spring according to claim 1, wherein
ridges are formed on both ends in a direction perpendicular to the coiling direction of the surface of the spring plate member so that the ridges project from the surface and projected surfaces of the ridges are curved, and material of the spring plate member moves easily to the ridges by forming the center portion of the back surface of the spring plate member to have a concave shape.

Therefore, claim 2 intends to achieve the object of claim 1 and reliably manufacture a spiral spring in which a pitch coiled structure best suited to achieve the object is formed.

Claim 3 is the spiral spring according to claim 1, wherein
the engagement piece is engaged with a concave portion provided on a lower casing included in a spring case that contains the spiral spring, and the engagement coiled core section is provided to a link rod coupled to a lock release lever of a seat of a vehicle.

Therefore, claim 3 intends to achieve the object of claim 1 and provide a reclining adjustment mechanism to which the spiral spring according to claim 1 in which a pitch coiled structure is formed can be attached.

Claim 4 is a spiral spring which is used for a vehicle in which ridges are formed on both ends of the spiral spring in a direction perpendicular to a coiling direction of a surface of a spring plate member so that the ridges project from the surface, projected surfaces of the ridges are flattened, and the spring plate member is spirally formed (coiled), wherein the spiral spring is formed to have a pitch coiled structure in which an outer spring plate member that is an outer end portion of the spiral, an intermediate spring plate member extending from the outer spring plate member, and an inner spring plate member extending from the intermediate spring plate member are coiled, and an engagement piece bent in the radial direction is formed at the end of the outer spring plate member, the engagement core section bent in substantially the same radial direction as that of the engagement piece is formed in the inner spring plate member, and a gap between the intermediate spring plate member and the inner spring plate member is formed to be larger than a gap between the outer spring plate member and the intermediate spring plate member to form the pitch coiled structure.

Therefore, claim 4 provides a spiral spring which is a spring plate member formed by a band-like steel plate having high hardness, and in which an engagement piece bent in the radial direction is formed at the end of the outer spring plate member, an engagement core section bent in substantially the same radial direction as that of the engagement piece is formed in the inner spring plate member, a gap between the intermediate spring plate member and the inner spring plate member is formed to be larger than a gap between the outer spring plate member and the intermediate spring plate member, and a pitch coiled structure best suited to a reclining adjustment mechanism is formed. The invention of claim 4 intends to surely achieve reliable winding of the spiral spring and restoration of the spiral spring to the original state which are characteristics of spiral springs, avoid abrasion, catching, and frictional noise at the time of contact, and reduce metal fatigue.

Claim 5 is the spiral spring according to claim 4, wherein
between a pair of ridges projected from the surface of the spring plate member, a concave/convex shape lower than the ridges is formed on the surface of the spring plate member via a cut groove provided in the coiling direction.

Therefore, claim 5 intends to achieve the object of claim 4 and reliably manufacture a spiral spring in which a pitch coiled structure best suited to achieve the object is formed.

Claim 6 is the spiral spring according to claim 4, wherein
the engagement piece is engaged with a moving body moveable in a cut groove provided in a case main body of a spring case that contains the spiral spring, and the engagement core section is provided to a link rod coupled to a lock release lever of a seat of a vehicle.

Therefore, claim 6 intends to achieve the object of claim 4 and provide a reclining adjustment mechanism to which the spiral spring according to claim 4 in which a pitch coiled structure is formed can be attached.

Claim 7 is the spiral spring according to claim 1 or 4, wherein
the spiral spring is formed by cold rolling.

Therefore, claim 7 intends to achieve the object of claims 1 and 4 and form a rational structure of the spiral spring according to claims 1 and 4 in which a pitch coiled structure is formed so that the spiral spring can be mass-produced.

BRIEF DESCRIPTION OF DRAWINGS

A first embodiment is shown in FIGS. 1 to 10.

A second embodiment is shown in FIGS. 11 to 16-2. FIGS. 16-1 and 16-2 are cross-sectional views of FIG. 15.

DETAILED DESCRIPTION

Figure 1:
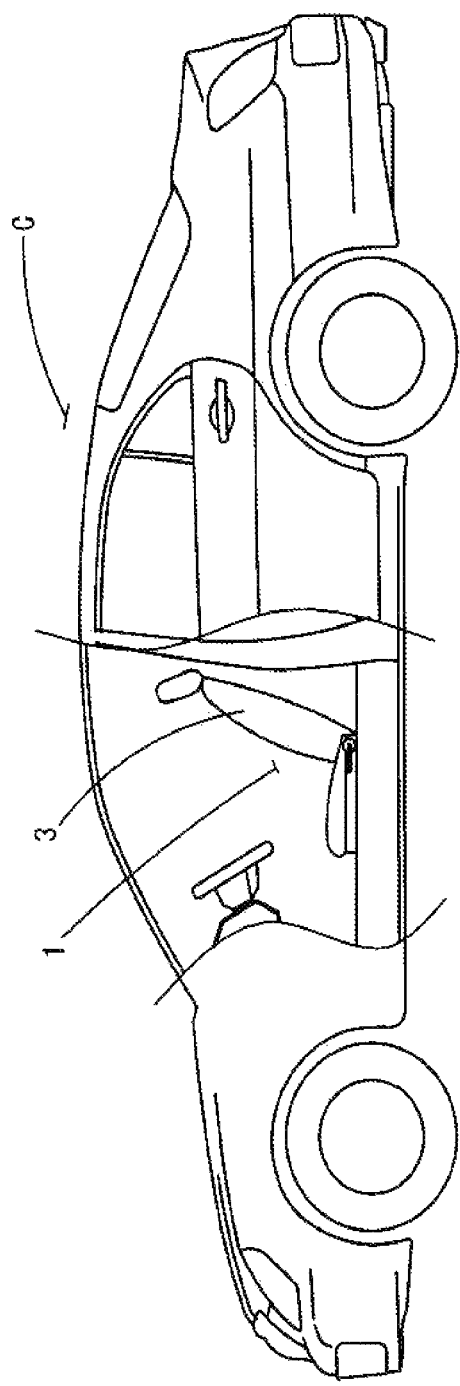
FIG. 1 is a scale side view of a vehicle.
Figure 2:
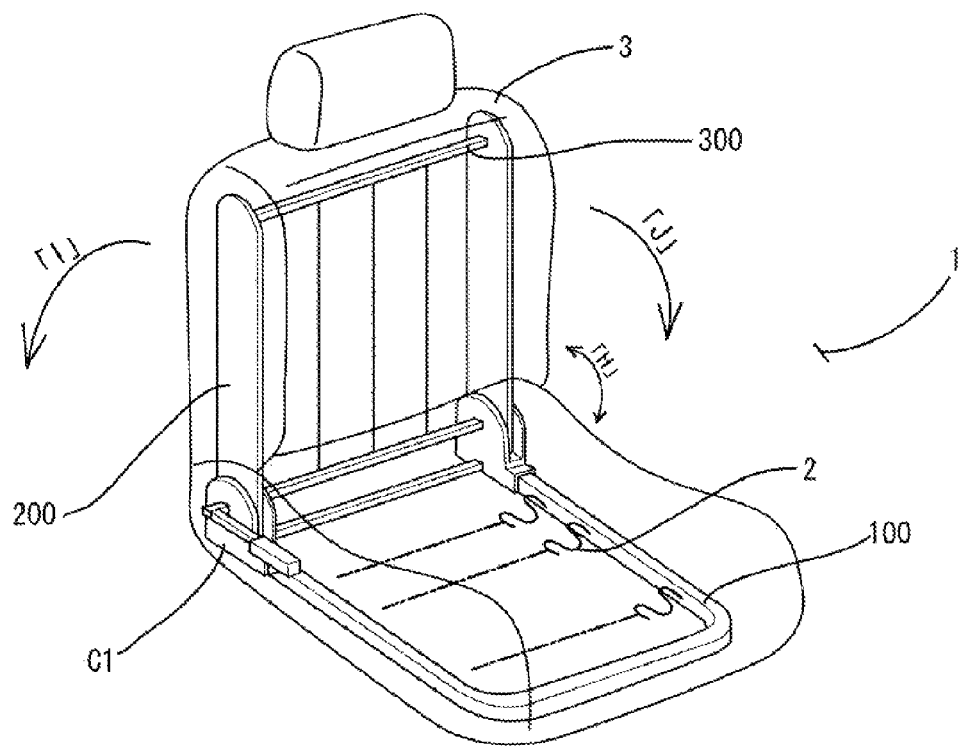
FIG. 2 is a perspective view showing a configuration of a frame provided in a first seat.
Figure 3:
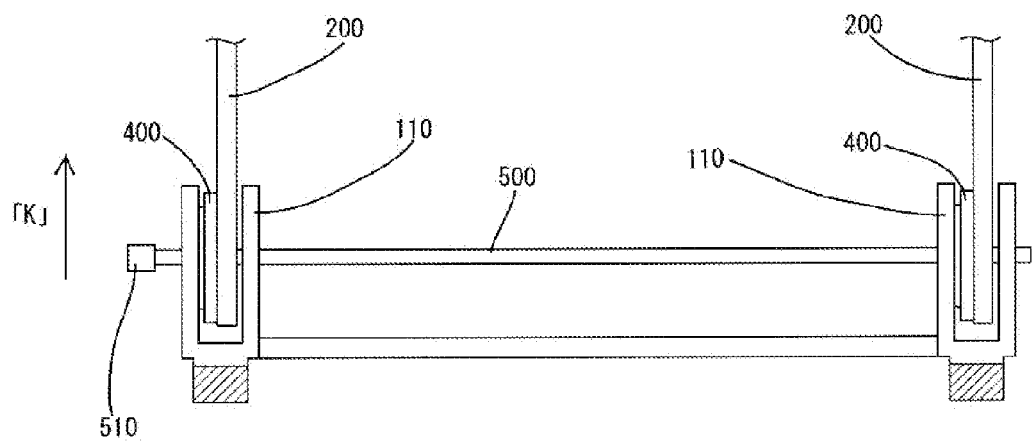
FIG. 3 is a front view of an entire reclining adjustment mechanism.
Figure 4:
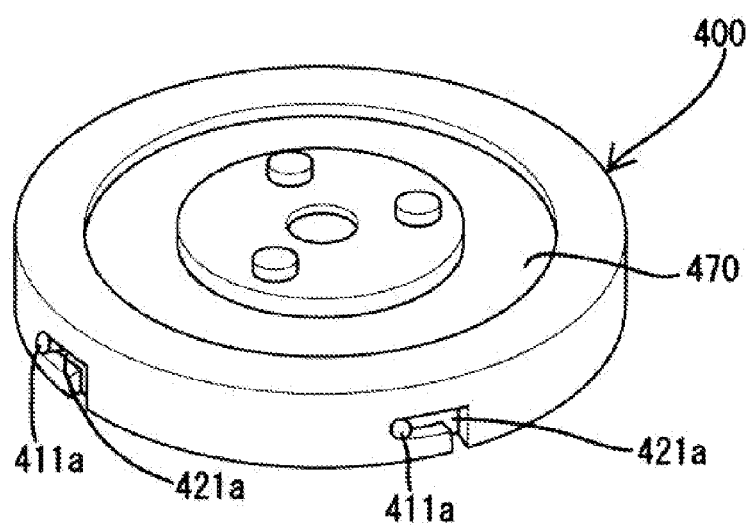
FIG. 4 is an enlarged perspective view of a main section of the reclining adjustment mechanism.

A first embodiment will be described. Reference numeral 1 in the figures denotes a first seat of a vehicle C. The first seat 1 has a framework including a floor frame 100 attached to a floor and a pair of upper arms 200 attached to the rear end of the floor frame 100. The floor frame 100 is formed into a rectangular frame shape, and a cushion frame 2 including a spring or the like is mounted in the rectangular frame. The cushion frame 2 has a structure covered from the above with a urethane pad (not shown in the figures) and a wool moquette (not shown in the figures). The upper arms 200, 200 (referred to as 200) are respectively attached to the left and the right rear ends of the floor flame 100 (as seen in the driving direction) at the lower end portions of the upper arms 200 so that the upper arms 200 can rotate in the front-back direction (arrow "H"). The upper end portions of the upper arms 200 are linked by a link member 300 having approximately the same length as the left-right width of the floor frame 100, and the left and right upper arms 200 move integrally in back and forth directions. The structure of the upper arms 200 includes the structure of the cushion frame 2 having a spring or the like (not shown in the figures) and a similar structure as that of the floor frame 100. The upper arms 200, the urethane pad, and the wool moquette configure a seat back 3.

A reclining adjustment mechanism C1 is provided between the lower end portion of the upper arm 200 and the rear end portion of the floor frame 100. In the reclining adjustment mechanism C1, for example, fork-shaped support sections 110, 110 (referred to as 110) having a U-shape as seen from the front are formed at left and right rear end portions of the floor frame 100. In a gap in the support section 110, a substantially disk-shaped spring case 400 containing a spiral spring 430 described below and the lower end portion of the upper arm 200 are inserted. In the spring case 400, the upper arm 200, and the support section 110, shaft holes penetrating each of them in the left-right direction are provided. A link rod 500 penetrates the shaft holes. One surface of the spring case 400 is welded and fixed to the support section 110 and the other surface is welded and fixed to the upper arm 200.

The link rod 500 is rotatably inserted into each shaft hole of the support section 110, the spring case 400, and upper arm 200. The link rod 500 is arranged as the axis of rotation of the upper arm 200. At the left end of the link rod 500, the rear end portion of a lock release lever 510 oriented in the front-back direction is disposed. Therefore, when the front end portion of the lock release lever 510 is raised upward (arrow "K"), according to a raised angle of the lock release lever 510, the link rod 500 having a square-shaped cross-section rotates in the same direction by the same angle. This is a structure, described below, in which a lock of the reclining adjustment mechanism C1 is released and a backward movement (arrow "I") or a forward tilting (arrow "J") of the seat back 3 can be achieved.

The spring case 400 is formed by a lower casing 410 (inner casing) and an upper casing 420 (outer casing). The lower casing 410 has a substantially disk-shape and has a side wall 411 disposed upright in the vertically upward direction from the circumference thereof. As described below, a spiral spring 430, a shaft member 440, a slide member 450, lock members 460, 460, a rotation member 470 are sequentially contained in the lower casing 410. The upper casing 420 has a substantially disk-shape and has a side wall 421 disposed upright in the vertically downward direction from the circumference thereof. The above-described side wall 411 is inserted inside the side wall 421. A fringe section 422 is extended from the upper end of the upper casing 420 toward the center, and the fringe section 422 forms a circular opening 422a. A shaft hole 412 is provided in the center of the lower casing 410, and, on the inner surface, a substantially circular concave portion 413 one step higher than the shaft hole 412 is provided with the shaft hole 412 as its center, and further, a substantially cross-shaped intermediate concave portion 414 one step higher than the concave portion 413 is formed with the shaft hole 412 as its center. On the outer circumference of the intermediate concave portion 414, a roughly half-cut-ring-shaped high concave portion 415 one step higher than the intermediate concave portion 414 is provided with the shaft hole 412 as its center. On the outer surface of the side wall 411, a plurality of engaging projections 411a projecting in the radial direction are provided at predetermined intervals in the circumferential direction. The engaging projections 411a are loosely fitted into engaging grooves 421a opened in the side wall 421 of the upper casing 420. Therefore, the diameter of the engaging projection 411a is slightly smaller than the engaging groove 421a. The engaging grooves 421a are formed from the open end (lower end) of the upper casing 420 toward the fringe section 422 (in the vertically upward direction), and then bent in the same circumferential direction to form a substantially L-shape as seen from the radial direction of the side wall 421.

Figure 5:
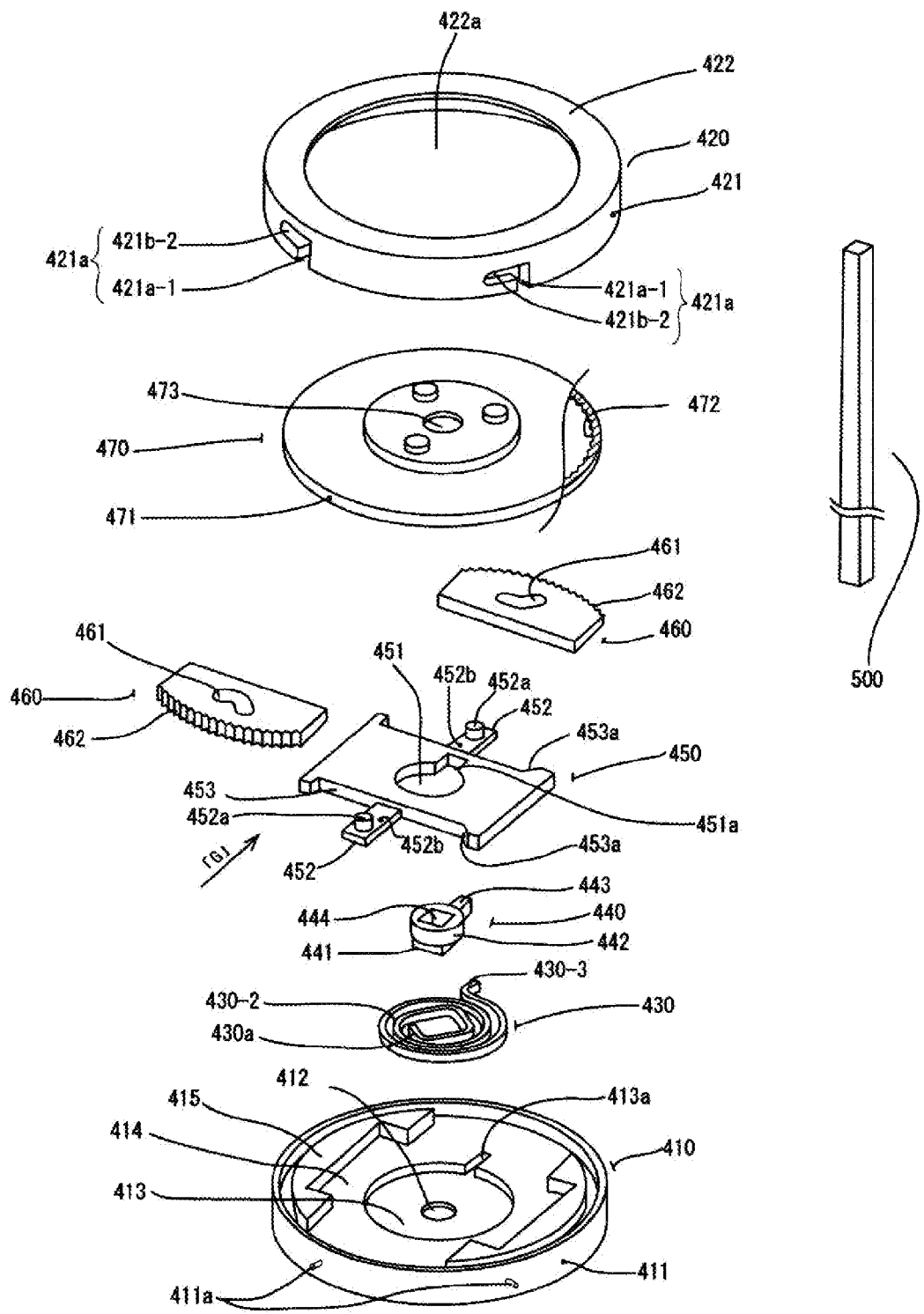
FIG. 5 is an exploded perspective view of FIG. 4.

An assembly of the spiral spring 430 will be described. The shaft member 440 is pressed into the engagement coiled core section 430*a* formed in the inner spring plate member 430-2 of the spiral spring 430, and the spiral spring 430 is contained in the concave portion 413. The engagement piece 430*b* formed in the outer spring plate member 430-3 of the spiral spring 430 is inserted and engaged in the engagement groove 413*a* formed from the circumferential portion of the concave portion 413 to the radial direction. When the spiral spring 430 is contained in the concave portion 413, the square-shaped bottom section 441 of the shaft member 440 is pressed and fitted into the engagement coiled core section 430*a*, and the link rod 500 is penetrated into the shaft hole 444 of the main body 442 of the shaft member 440. Then, the main body 442 is contained in the through-hole 451 provided in the center of the slide member 450 which is contained in the intermediate concave portion 414 of the lower casing 410. The convex portion 443 projecting in the radial direction of the main body 442 is inserted and engaged in the notch 451*a* opened from the circumference of the through-hole 451 of the slide member 450 in the radial direction. In the front and the rear of the slide member 450 (in the direction indicated by arrow "G" in FIG. 5), the arms 452, 452 (referred to as 452) are extended respectively, and at the end portions of the arms 452, the guide pins 452*a*, 452*a* (referred to as 452*a*) are disposed upright in the vertically upward direction. The guide pins 452*a* are inserted into the guide grooves 461, 461 (referred to as 461) of the lock members 460, 460 (referred to as 460). The lock members 460 are contained in the concave portions 453, which are cut and formed in the front and the rear of the slide member 450 and include the guiding slope 453*a*. The lock members 460 are supported by the upper surfaces 452*b*, 452*b* (referred to as 452*b*) of the arms 452. In this state, the lock members 460 are contained in the intermediate concave portion 414 of the lower casing 410. The guiding slope 453*a* can exert effectiveness for smooth movement of the lock member 460 and smooth movement between the guide groove 461 and the guide pin 452*a*. The rotation member 470 is fitted in the lock members 460 and the slide member 450. When the rotation member 470 is fitted in, the lock teeth 462, 462 of the lock members 460 engage or disengage the engaging teeth 472 internally provided on the ring-shaped side wall 471 of the rotation member 470 by back-and-forth movement of the lock members 460. In the figures, reference numeral 473 denotes a shaft hole provided in the top plate of the rotation member 470. Thereafter, the upper casing 420 is attached to the lower casing 410 from above, so that the spring case 400 is configured. At this time, when the engaging projections 411*a* are respectively inserted from the corresponding groove sections 421*a*-1 of the engaging grooves 421*a*, and the upper casing 420 is rotated in a counterclockwise direction with respect to the lower casing 410, the engaging projections 411*a* are held in the engaging grooves 421*b*, so that the vertical movement of the upper casing 420 is limited and the upper casing 420 can move along the circumferential groove sections 421*b*-1 of the engaging grooves 421*a*. In this operation, each component member (hereinafter referred to as each component member) such as the spiral spring 430, the shaft member 440, the slide member 450, and the like is held in the spring case 400.

Next, operations of each component member held in the spring case 400 will be described. The shaft hole 444 provided in the shaft member 440 is fitted into the engagement coiled core section 430*a* slightly larger than the outer shape of the link rod 500, and the link rod 500 having a rectangular cross-sectional shape is inserted into the shaft hole 444. In the main body 442 of the shaft member 440, the convex portion 443 projecting in the radial direction is extended from the upper end portion, and the convex portion 443 is inserted and engaged in the notch 451*a* in the slide member 450. The maximum left-right width of the intermediate concave portion 414 is formed to be wider than the left-right width of the slide member 450, so that, when the notch 451*a* is pressed in the left or right direction by rotation of the convex portion 443 of the shaft member 440, the slide member 450 slides in the moving direction of the notch 451*a*.

The guide groove 461 is formed to have a substantially circular arc shape so that the guide groove 461 approaches the shaft hole 412 (473) in the left hand side and the guide groove 461 moves away from the shaft hole 412 in the right hand side, so that, when the slide member 450 slides in the right direction, the guide pin 452*a* is guided along the guide groove 461, and thus the lock member 460 gradually approaches the shaft hole 412. In the lock member 460, a portion facing the inner surface of the side wall 471 has a circular arc shape, and teeth are provided on the portion facing the inner surface in the circumferential direction around the shaft hole 412. In the same way as in the lock member 460, the engaging teeth 472 is provided on the inner surface of the side wall 471 provided in the rotation member 470 contained in the high concave portion 415 in the inner circumferential direction around the shaft hole 412 (473). The engaging teeth 472 and the teeth on the lock member 460 can be engaged with each other.

Figure 6:
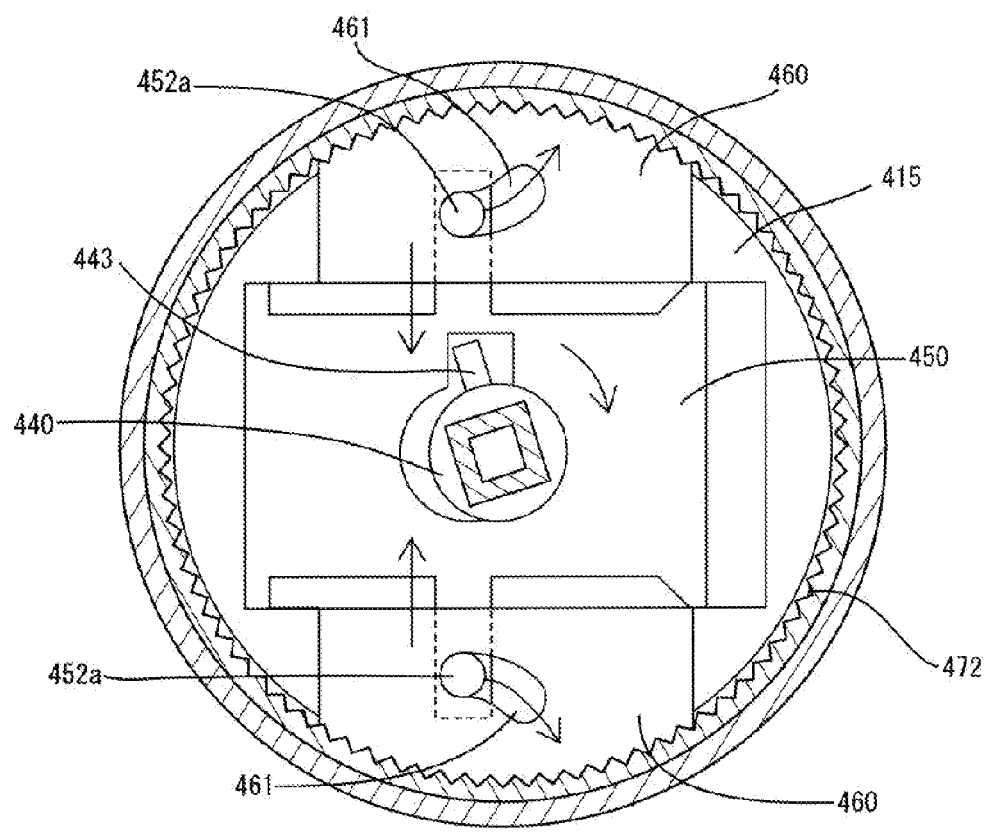
FIG. 6 is a cross-sectional view showing an arrangement of members when locked.
Figure 7:
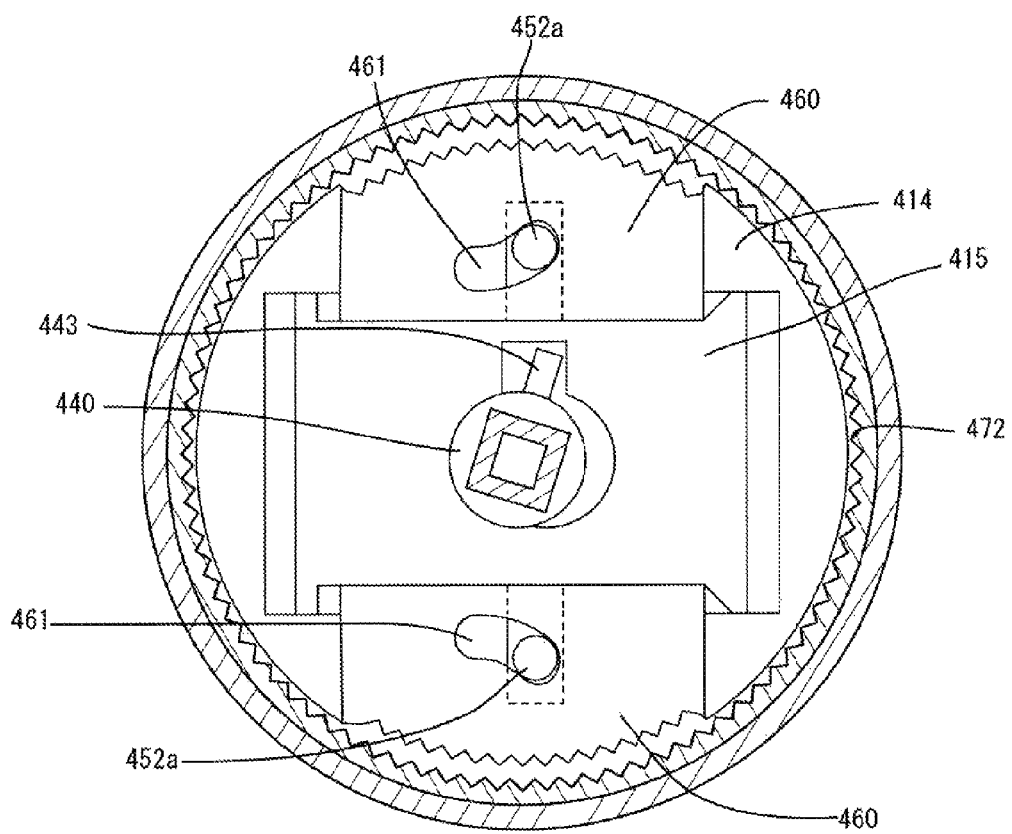
FIG. 7 is a cross-sectional view showing an arrangement of members when lock is released.
Figure 8:
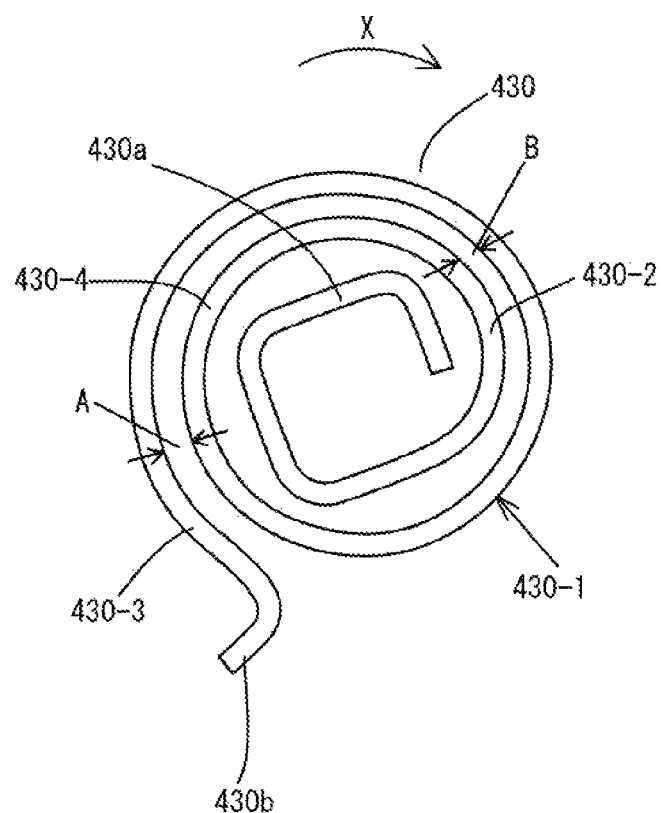
FIG. 8 is a side view showing a configuration of a spiral spring.
Figure 9:
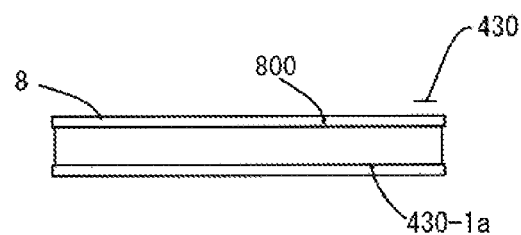
FIG. 9 is a plan view of FIG. 8.

Therefore, normally, as shown in FIG. 6, the notch 451*a* is pressed in the left direction by the convex portion 443, so that the slide member 450 is located in the left hand side, and the lock member 460 engages with the engaging teeth 472 of the rotation member 470. Therefore, rotation of the lower casing 410 with respect to the rotation member 470 is restricted, and a tilting angle of the upper arm 200 fixed to the lower casing 410 is prevented from changing. Here, if the lock release lever 510 is raised, the link rod 500 in FIG. 6 rotates in a clockwise direction, so that the shaft member 440 also rotates in a clockwise direction, and the convex portion 443 presses the notch 451*a* in the right direction. Then, as shown in FIG. 7, the slide member 450 slides in the right direction while pulling the lock members 460 toward the shaft hole 412 (473). Therefore, the lock member 460 disengages from the engaging teeth 472 of the rotation member 470, so that the lock is released, the rotation of the lower casing 410 with respect to the rotation member 470 is allowed, and the tilting angle of the upper arm 200 can be changed. When the lock release lever 510 is raised, the shaft member 440 rotates to wind the inner spring plate member 430-2 of the spiral spring 430 in a clockwise direction while opposing urging force, so that a resistance force is generated in the rotation of the link rod 500 and a user who operates the lock release lever 510 can feel the resistance force. When the user releases the lock release lever 510, the spiral spring 430 tries to rotate the center in a counter clockwise direction and return to its initial shape by its own resilience, so that the shaft member 440 is also pushed back in a counter clock wise direction. Based on this, the notch 451*a* is pressed to the left hand side by the convex portion 443, so that the slide member 450 slides in the left direction while pushing back the lock members 460 toward the inner surface of the side wall 471 of the rotation member 470. Therefore, the lock member 460 engages again with the engaging teeth 472 of the rotation member 470, so that the rotation of the lower casing 410 with respect to the rotation member 470 is restricted. When the rotation of the lower casing 410 with respect to the rotation member 470 is allowed, if it is tried that the seat back 3 is tilted backward (arrow "T") and the upper arms 200 are tilted backward, the outer spring plate member 430-3 and the engagement piece 430b of the spiral spring 430 pressed into the engagement groove 413a of the concave portion 413 are rotated in a clockwise direction. At this time, the seat back 3 is tried to be tilted backward while opposing the urging force of the spiral spring 430, so that the user can feel the urging force. When the force applied to the seat back 3 is removed while the lock is released, the spiral spring 430 rotates the outer spring plate member 430-3 and the engagement piece 430b in a counter clockwise direction and return to its initial shape by its own resilience, so that the seat back 3 is pushed back in the front direction (arrow "H").

Figure 10:
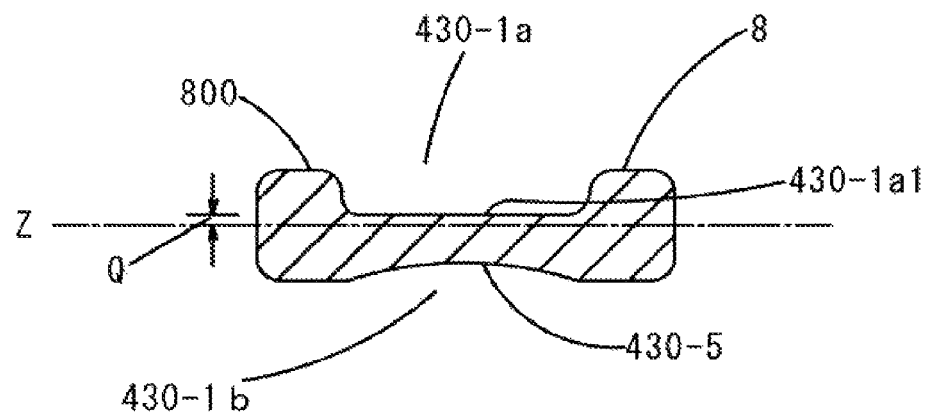
FIG. 10 is a cross-sectional view of FIG. 8.
Figure 11:
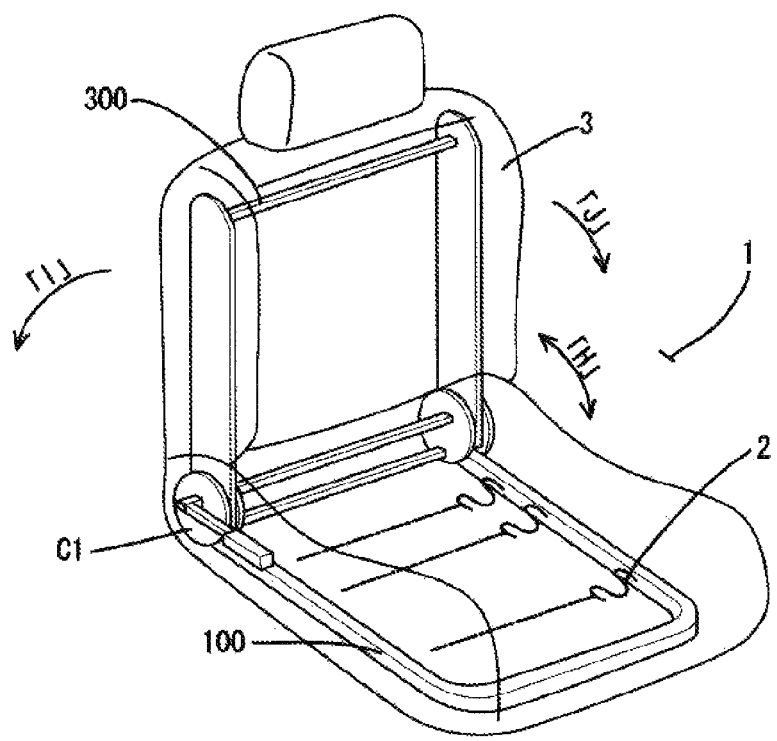
FIG. 11 is a perspective view showing a configuration of a frame provided in a first seat.

A preferred example of the spiral spring 430 will be described. The ridges 8 are formed on both ends in a direction perpendicular to the coiling direction (X direction) of the front surface 430-1a of the spring plate member 430-1 so that the ridges 8 project from the front surface 430-1a and the projected surfaces 800 of the ridges 8 are curved. The spring plate member 430-1 has a pitch coiled structure and includes the outer spring plate member 430-3, the intermediate spring plate member 430-4 extending from the outer spring plate member 430-3, and the inner spring plate member 430-2 extending from the intermediate spring plate member 430-4. The intermediate spring member 430-4 may have a structure in which the intermediate spring member 430-4 is coiled to form multiple layers of the intermediate spring member 430-4. The engagement piece 430b bent in the radial direction is formed at the end of the outer spring plate member 430-3, and the engagement coiled core section 430a is formed on the inner spring plate member 430-2. The feature of the present invention is to form a pitch coiled structure in which the gap B formed between the intermediate spring plate member 430-4 and the inner spring plate member 430-2 is smaller than the gap A formed between the outer spring plate member 430-3 and the intermediate spring plate member 430-4. By using this structure, when the spiral spring 430 is tightened, the contact on the front surface 430-1a is avoided, so that a feature to avoid fatigue is obtained by utilizing characteristics of the spiral spring 430. Further, there is effectiveness that the durability is improved and back-and-forth movement of the seat back 3 can be guaranteed. Although not shown in the figures, as another structure of the present invention, it is possible to employ a structure, in which an inner spiral portion (from the inner spring plate member 430-2 to the intermediate spring plate member 430-4) has an uneven pitch and an outer spiral portion (from the outer spring plate member 430-3 to the intermediate spring plate member 430-4) has an even pitch, and stabilize the winding load, the returning load, and the returning speed. As shown in FIG. 10, by reducing a distance (distance Q or the like) between round surfaces at corners in the cross-section and/or the neutral axis Z and the bottom section 430-1a1 of the front surface 430-1a, there are features that material movement and mill hysteresis can be reduced and the degree of accuracy can be improved.

Figure 12:
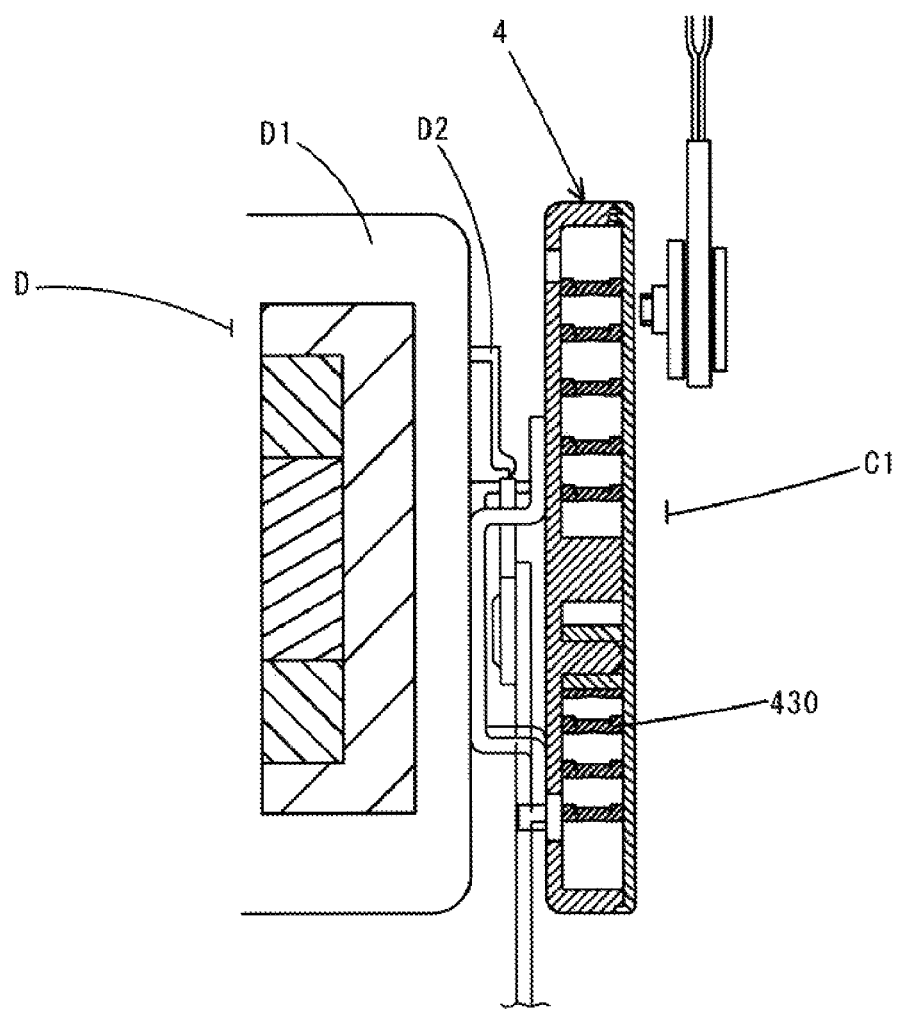
FIG. 12 is a front view of an entire reclining adjustment mechanism.
Figure 13:
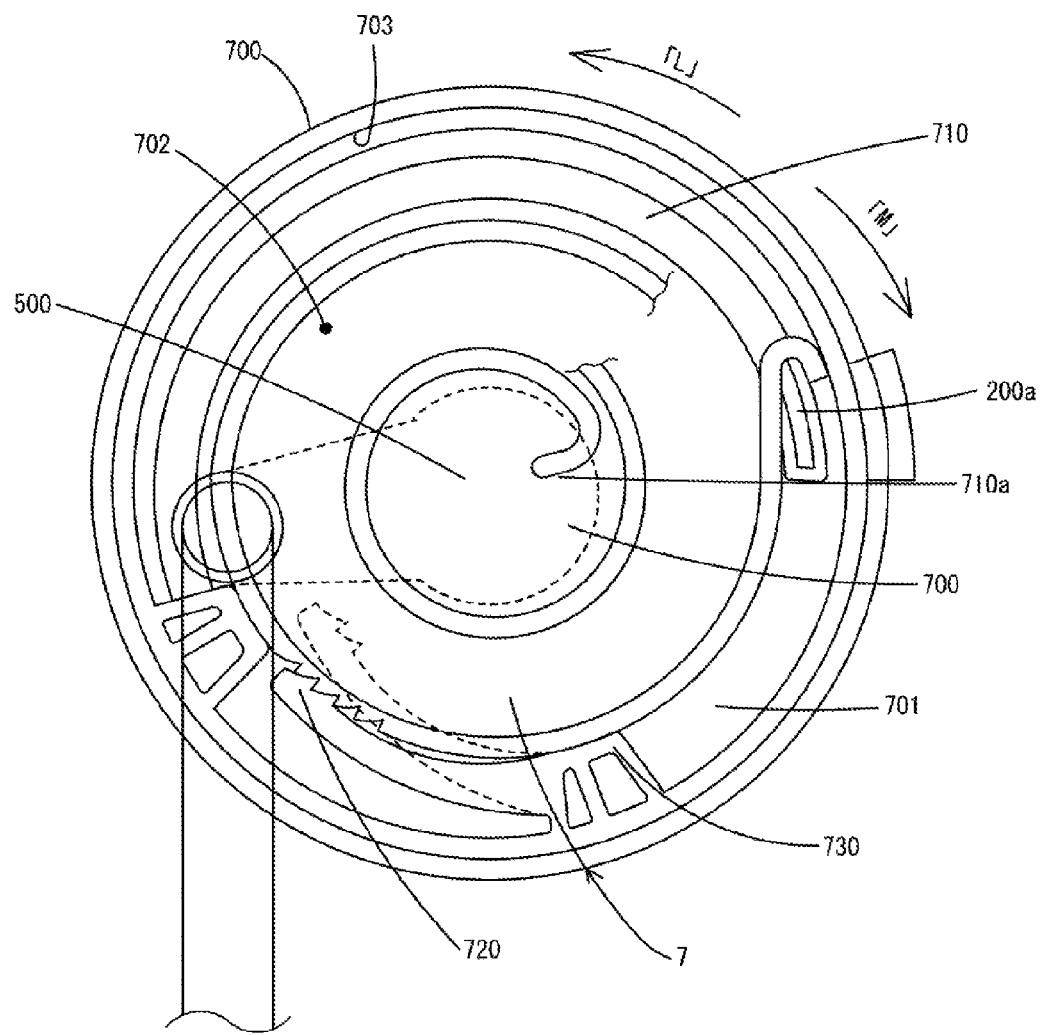
FIG. 13 is an enlarged side view of a main section of the reclining adjustment mechanism.
Figure 14:
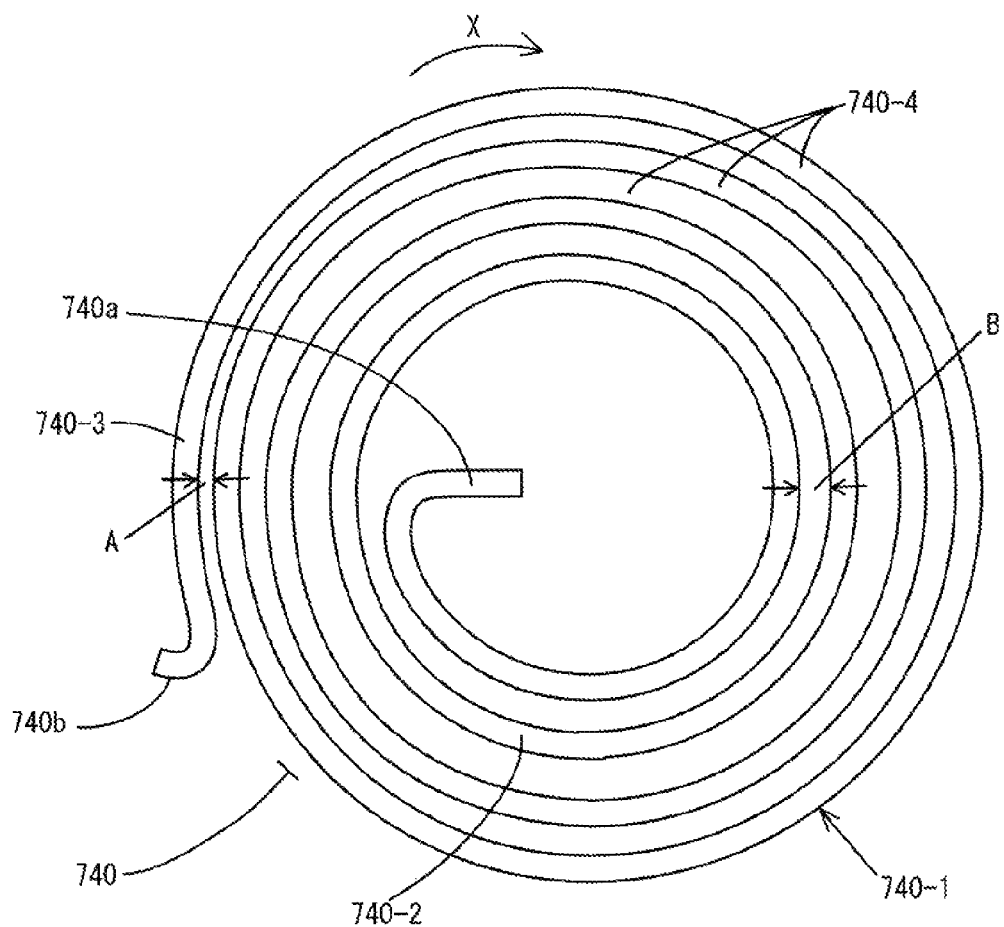
FIG. 14 is a side view showing a configuration of a spiral spring.
Figure 15:
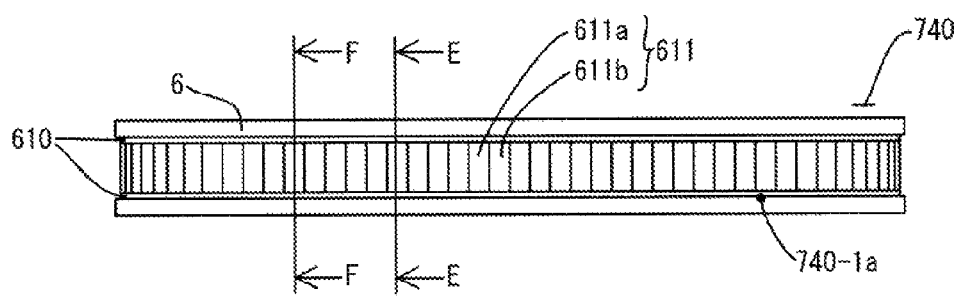
FIG. 15 is a plan view of FIG. 14.

Next, a second embodiment will be described. FIGS. 12 and 13 show a structure in which the casing 7 is attached (attachably and detachably attached, or integrally attached) to a plurality of engagement band sections D2 (not shown in the figures, but there may be other attaching means) provided on the main body D1 of the lock mechanism D. In the lock mechanism D, the casing 7 includes the side wall 700 and the bottom section 701, and forms a room 702 for containing a spiral spring (described below). In the center of the room 702, the link rod 500 including the engagement groove 710a for engaging an inner spring plate member (described below) of the spiral spring (described below) and the half-cut-ring-shaped movement groove 710 into which the engagement piece 200a projecting from the upper arm 200 located around the link rod 500 are formed. An outer spring plate member (described below) of the spiral spring is engaged with the engagement piece 200a. The spiral spring is engaged with the engagement groove 710a and the engagement piece 200a. The spiral spring has a structure to be contained in the room 702. By providing the restricting piece 720 on the inner wall surface 703 of the casing 7, it is possible to soften the shock of the seat back 3 and avoid sudden tilting of the seat back 3. In the figures, reference numeral 730 denotes several guide pieces for guiding the spiral spring. A plurality of the guide pieces 730 are provided from the inner wall surface 703 toward the center of the casing 7.

Operations of each component member contained in the casing 7 will be described. By tilting the seat back 3, the engagement piece 200a inserted into the guide groove 710 moves in a counter clockwise direction (arrow "L"), and the spiral spring is compressed from the outer spring plate member toward the intermediate spring plate member (described below), and thus the urging force of the spiral spring increases. By this operation, the seat back is tilted to a predetermined position, and in this state, the lock mechanism works, and the seat back 3 is locked. To release the lock of the lock mechanism, in the same manner as in the first embodiment, the lock release lever 510 is used. In this case, the outer spring plate member of the spiral spring and the engagement piece 200a move in the guide groove 710 in a clockwise direction (arrow "M"), and the seat back 3 can be smoothly tilted up via the urging force of the spiral spring and release of the compression (restoration). There are features that random action of the spiral spring can be avoided and the seat back 3 can be reliably returned to the original position via the movement of the restricting piece 720 and/or the contact to the guide piece 730 by the restoration of the urging force of the spiral spring and the like.

Figures 1, 16:
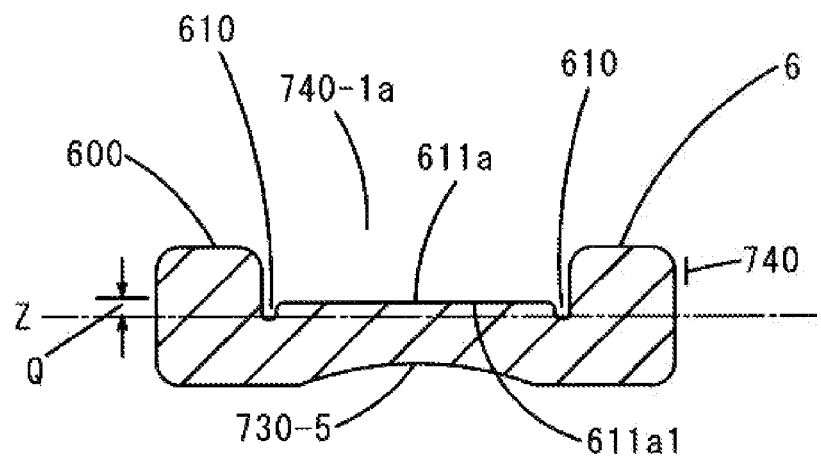
Figures 2, 16:
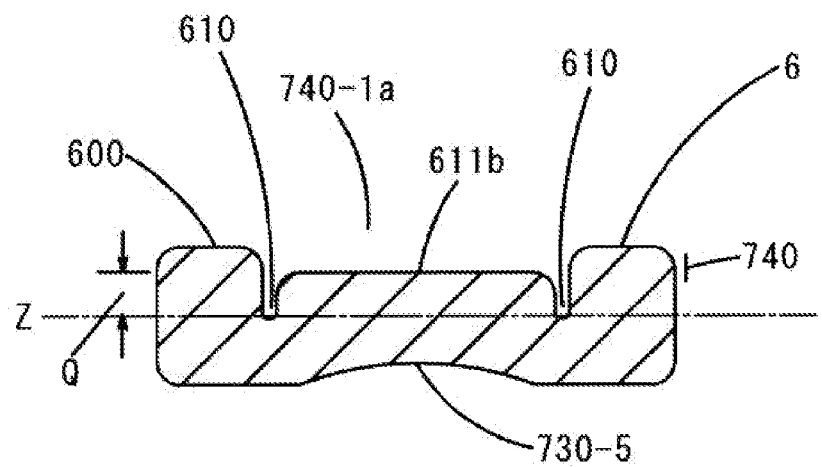

Next, a preferred example of the spiral spring 740 will be described. The ridges 6 are formed on both ends in a direction perpendicular to the coiling direction (X direction) of the front surface 740-1a of the spring plate member 740-1 so that the ridges 6 project from the front surface 740-1a and the projected surfaces 600 of the ridges 6 are curved. Inside the ridges 6, the grooves 610 lower than the front surface 740-1a are provided, and further, the teeth 611 including the concave portions 611a and the convex portions 611b are provided between the grooves 610 in the X direction. The teeth 611 have a structure to be in contact with the restricting piece 720 and engage with the restricting piece 720. The spring plate member 740-1 has a pitch coiled structure and includes the outer spring plate member 740-3, the intermediate spring plate member 740-4 extending from the outer spring plate member 740-3, and the inner spring plate member 740-2 extending from the intermediate spring plate member 740-4. The intermediate spring member 740-4 may have a structure in which the intermediate spring member 740-4 is coiled to form multiple layers of the intermediate spring member 740-4. The engagement piece 740b bent in the radial direction is formed at the end of the outer spring plate member 740-3, and the engagement core section 740a bent in substantially the same radial direction as that of the engagement piece 740b is formed on the inner spring plate member 740-2. The feature of the present invention is to form a pitch coiled structure in which the gap B formed between the intermediate spring plate member 740-4 and the inner spring plate member 740-2 is larger than the gap A formed between the outer spring plate member 740-3 and the intermediate spring plate member 740-4. By using this structure, when the spiral spring 740 is tightened, the contact on the front surface 740-1a is avoided, so that a feature to avoid fatigue is obtained by utilizing characteristics of the spiral spring 740. Further, there is effectiveness that the durability is improved and back-and-forth movement of the seat back 3 can be guaranteed. The object of forming the groove 610 is to make it easy to form shapes of the ridges 6 and the teeth 611, and the object of forming the ridges 6 and/or the teeth 611 is to thin the spring plate member 740-1. As shown in FIG. 16-1, by reducing a distance between round surfaces at corners in the cross-section and/or the neutral axis Z and the bottom section 611-1a1 of the concave portion 611a, the same features as described above are expected to be obtained.

As described above, regarding the ridges 8, 6 (referred to as 8) of the spiral springs 430, 730 (referred to as 430), in a process in which the seat back 3 is tilted backward, when the spiral spring 430 is being wound, even if the spring plate members 430-1, 730-1 (referred to as 430-1) facing each other come in contact with each other, the contact between the spring plate members 430-1 facing each other is a point contact on the projected surfaces 800, 600 (referred to as 800) of the ridges 8, so that the ridges 8 have a feature that the contact area is reduced and features that the spiral spring 430 can be smoothly and continuously wound and the spring performance can be sufficiently exerted. In particular, in a structure in which the ridges 8 are formed on both ends in a direction perpendicular to the coiling direction of the front surface 430-1a of the spring plate member 430-1 so that the projected surfaces 800 are curved and further the concave surface 430-5 where the center portion is recessed is formed in the coiling direction of the back surface 430-1b of the spring plate member 430-1, there are features that the contact area can be further reduced and lubricant oil can be retained in addition to the features described above (this is also possible in the second embodiment). The second embodiment is extremely effective for forming the shape of the teeth 611 of the spring plate member 730-1 and making it easy to move material.

Although not shown in the figures, as another structure of the present invention, it is possible to employ a structure, in which an inner spiral portion (from the inner spring plate member 430-2, 730-2 to the intermediate spring plate member 430-4, 730-4) has an uneven pitch and an outer spiral portion (from the outer spring plate member 430-3, 730-3 to the intermediate spring plate member 430-4, 730-4) has an even pitch, and stabilize the winding load, the returning load, and the returning speed.

In the present invention, the structure of the spiral springs 430 and 730 in which the pitch coiled structure is formed can be rationalized and also be mass-produced by forming the spiral springs 430 and 730 by cold rolling. To make it easy to form the spiral springs 430 and 730 by cold rolling (to make it easy to move material), each corner of the cross-section is rounded and further the concave portion 430-5 and the concave portion 730-5 are formed.

REFERENCE NUMERALS 1 first seat
100 floor frame
110 support section
2 cushion frame
200 upper arm
200a engagement piece
3 seat
300 link member
400 spring case
410 lower casing
411 side wall
411a engaging projection
412 shaft hole
413 concave portion
413a engagement groove
414 intermediate concave portion
415 high concave portion
420 upper casing
421 side wall
421a engaging groove
421a-1 groove section
421b-1 groove section
422 fringe section
422a opening
430 spiral spring
430a engagement coiled core section
430b engagement piece
430-1 spring plate member
430-1a front surface
430-1a1 bottom section
430-1b back surface
430-2 inner spring plate member
430-3 outer spring plate member
430-4 intermediate plate member
430-5 concave surface
440 shaft member
441 square-shaped bottom section
442 main body
443 concave portion
444 shaft hole
450 slide member
451 through-hole
451a notch
452 arm
452a guide pin
452b upper surface
453 concave portion
453a guiding slope
460 lock member
461 guide groove
462 lock teeth
470 rotation member
471 side wall
472 engaging teeth
473 shaft hole
500 link rod
510 lock release lever
511 engagement groove
6 ridge
600 projected surface
610 groove
611 teeth
611a concave portion
611a1 bottom section
611b convex portion
7 casing
700 side wall
701 bottom section
702 room
703 inner wall surface
710 guide groove
710a engagement groove
720 restricting piece
730 guide piece
740 spiral spring
740a engagement core section
740b engagement piece 740-1 spring plate member
740-2 inner spring plate member
740-3 outer spring plate member
740-4 intermediate plate member
730-5 concave surface
8 ridge
800 projected surface
A gap
B gap
C vehicle
C1 reclining adjustment mechanism
D lock mechanism
D1 main body
D2 engagement band section

INDUSTRIAL APPLICABILITY

In view of the above situation, to achieve the pitch coiled structure (spring characteristics of a reclining adjustment mechanism), the present invention provides two types of spiral springs, which are a spiral spring having a structure of "a spring plate member formed by a band-like steel plate having high hardness in which an engagement piece bent in the radial direction is formed at the end of the outer spring plate member, an engagement coiled core section is formed in the inner spring plate member, and a gap between the intermediate spring plate member and the inner spring plate member is formed to be smaller than a gap between the outer spring plate member and the intermediate spring plate member" and a spiral spring having a structure of "a spring plate member formed by a band-like steel plate having high hardness in which an engagement piece bent in the radial direction is formed at the end of the outer spring plate member, the engagement core section bent in substantially the same radial direction as that of the engagement piece is formed on the inner spring plate member, and a gap between the intermediate spring plate member and the inner spring plate member is formed to be larger than a gap between the outer spring plate member and the intermediate spring plate member". The present invention intends to surely achieve reliable winding of the spiral spring (seat back is smoothly tilted to a rear position) and restoration of the spiral spring to the original state (the seat back is smoothly returned to a forward position) which are characteristics of spiral springs, avoid abrasion, catching, and frictional noise at the time of contact, and reduce metal fatigue. As another structure of the present invention, the present invention intends to stabilize the winding load, the returning load, and the returning speed by employing a structure in which an inner spiral portion has an uneven pitch and an outer spiral portion has an even pitch. Further, the present invention intends to solve the problem related to the returning speed of the spring and/or the reclining seat by reducing the contact area and requiring the pitch coiled structure.

What is claimed is:

1. A spiral spring for a vehicle comprising:
ridges formed on both ends of the spiral spring in a direction perpendicular to a coiling direction of a surface of a spring plate member so that the ridges project from the surface, projected surfaces of the ridges are curved, and the spring plate member is spirally formed, wherein
the spiral spring has a pitch coiled structure in which the spring plate member comprises an outer spiral portion, an inner spiral portion, and an intermediate spiral portion extending between the outer spiral portion and the inner spiral portion, and
an engagement piece bent outward in a radial direction is formed at an end of the outer portion, an engagement coiled core section bent inward in a radial direction is formed extending from an end of the inner spiral portion, and a first gap between the intermediate spiral portion and the outer spiral portion is formed to be smaller than a second gap between the inner spiral portion and the intermediate spiral portion to form the pitch coiled structure,
wherein grooves lower than the surface are provided inside of the ridges, and teeth having a concave portion and a convex portion lower than the ridges are provided in the coiling direction between the grooves,
wherein a center portion of a back surface of the spring plate member has a concave shape, and wherein the inner spiral portion has a pitch increasing toward the intermediate spiral portion and an outer spiral portion has a pitch decreasing toward the end of the outer spiral portion.

2. The spiral spring according to claim 1, wherein
the engagement piece is engaged with a concave portion provided on a lower casing included in a spring case that contains the spiral spring, and the engagement coiled core section is provided to a link rod coupled to a lock release lever of a seat of the vehicle.

3. A spiral spring for a vehicle comprising:
ridges formed on both ends of the spiral spring in a direction perpendicular to a coiling direction of a surface of a spring plate member so that the ridges project from the surface, projected surfaces of the ridges are flattened, and the spring plate member is spirally formed, wherein
the spiral spring has a pitch coiled structure in which the spring plate member comprises an outer spiral portion, an inner spiral portion, and an intermediate spiral portion extending between the outer spiral portion and the inner spiral portion, and
an engagement piece bent outward in a radial direction is formed at an end of the outer spiral portion, an engagement core section bent inward in substantially the same radial direction as that of the engagement piece is extending from the inner spiral portion, and a second gap between the intermediate spiral portion and the inner spiral portion is formed to be larger than a first gap between the outer spiral portion and the intermediate spiral portion to form the pitch coiled structure,
wherein a center portion of a back surface of the spring plate member has a concave shape, and wherein the inner spiral portion has a pitch increasing toward the intermediate spiral portion and an outer spiral portion has a pitch decreasing toward the end of the outer spiral portion.

4. The spiral spring according to claim 3, wherein
between the ridges projected from the surface of the spring plate member, the spiral spring has teeth provided in the coiling direction, thereby a concave shape or a convex shape lower than the ridges is formed on the surface of the spring plate member in the coiling direction.

5. The spiral spring according to claim 3, wherein
the engagement piece is engaged with a moving body moveable in a cut groove provided in a case main body of a spring case that contains the spiral spring, and the engagement core section is provided to a link rod coupled to a lock release lever of a seat of the vehicle.

6. The spiral spring according to claim 1 or 3, wherein
the spiral spring is formed by cold rolling.

* * * * *